Nov. 19, 1935.  E. ROIRANT  2,021,670
MACHINE FOR THE MANUFACTURE OF BOTTLES, FLAGONS
AND OTHER HOLLOW GLASS OBJECTS
Filed Jan. 28, 1932   3 Sheets-Sheet 3

E. Roirant
INVENTOR

By: Marks & Clerk
ATTYS.

Patented Nov. 19, 1935

2,021,670

UNITED STATES PATENT OFFICE

2,021,670

MACHINE FOR THE MANUFACTURE OF BOTTLES, FLAGONS, AND OTHER HOLLOW GLASS OBJECTS

Emile Roirant, Paris, France, assignor to Société Anonyme d'Etudes et de Constructions d'Appareils Mecaniques pour la Verrerie, Paris, France Application January 28, 1932, Serial No. 589,454
In France January 31, 1931

8 Claims. (Cl. 49—5)

The present invention relates to the manufacture of hollow glass objects, especially to the manufacture of bottles and flagons, the glass being lifted by suction into the parison molds, from glass contained in a receiver attached to the melting chamber.

The machine necessary for the transformation into bottles of the glass drawn into the parison molds is of that type having a plurality of molds spaced apart equally upon two drums placed side by side, one of the drums carrying the parison molds and the other the finishing molds.

The parisons formed in the parison molds of the first drum are delivered into the finishing molds of the second drum where they are blown into their definite form.

All this has long been known and the object of this invention is to improve this system of manufacture by a combination of means avoiding certain difficulties and presenting very appreciable advantages of manufacture.

In the first place it is advantageous for the system of lifting glass by suction to expose to the atmosphere outside the melting chamber only the smallest possible surface of glass.

A first novel characteristic of the invention resides in the immobility of the parison mold during suction. For this purpose, the parison carrying drum receives an intermittent rotary motion, so that each of the molds can be plunged into the glass in succession at a determined point and remain stationary during sufficient time to suck up its charge of glass.

Although according to this practice the quantity of glass exposed to free air is small, it is necessary in order to avoid any deterioration of the glass, to heat it after each suction; the invention provides for this purpose a wheel having refractory paddles actuated by a moving part of the machine, so that each parison mold is presented to a new surface of glass, the preceding surface having been positively removed towards the interior of the heating chamber.

A third element of the combination consists in means for communicating to the parison carrying drum a rising and falling motion. The rising and falling motion not only causes the walls of the receiver containing the glass to pass above each of the parison molds and to plunge into the molten glass, but it also eliminates the difficulties which are caused by insufficient length of the parisons which are to be delivered to the finishing molds arranged upon the adjacent drum. In applicant's apparatus the parison may be slightly longer than the finished bottle; from this it results that the base of the parison is altered in shape and is flattened upon the finishing bottom. Now, it is known that, under these conditions, the final blowing may be accelerated, from which there is an appreciable gain in the time necessary for the manufacture of the object.

The principle of intermittent motion of the revolving drum so desirable for raising the glass by suction introduces difficulties in the productions of necessary movements of parts of the apparatus during the stoppages of mold carrying drums. Parts of a device for shaping the bottles must be put in motion during the above-mentioned stoppages. Cam paths upon the shaft around which the drums rotate are usually used to produce motion of said parts, hence when the drum is not rotating no such motion of said parts takes place. One object of this device is to overcome this difficulty. It is true that in some apparatus this difficulty is overcome by giving the drums a continuous motion but this practice presents the grave inconvenience of exposing to free air a large surface of glass the particular results of which are increased the motion of the parison molds. The difficulty above referred to is overcome in this apparatus by adding to each of the mold carrying drums a cam path which may receive an oscillating motion, the period of which bears a convenient relation to the period of the intermittent motion of the drums. If this oscillation takes place in the reverse direction to the movement of the drums, during the stoppage of these latter, it is evident that, due to this movement, all the desired operations may take place during the stopping of the mold carrying drums. It will then suffice to return the cam path to its starting position during the following phase of rotation of the drums in order that it may then be capable of renewing the same action, which ought to take place during each stopping period of the drums.

To understand the operation of the device, it is necessary to note the connection of the two mold carrying drums which is effected by two toothed wheels in gear with each other and placed above the molds. This arrangement protects the teeth from bits of waste glass, which are inevitable, and offers facilities for driving connections with the shaft having paddles in the receiver for the glass. The synchronism of the passage of the molds and of the paddles is thus easily assured and the connection with the machine does not comprise any supplementary part. This connection is effected or destroyed by putting the machine into or out of its working position.

It is finally extremely advantageous to be able to manufacture easily bottles of different types upon one machine that comprises several sets of molds. As the mass of a bottle, in this process of manufacture, is solely a function of the capacity of the parison mold and as the other characteristics are also determined by the dimensions of the molds, the setting of the molds constitutes the only important factor in the necessary regulations for obtaining bottles of different types. The ring mold alone is individually and easily regulated in height. This ease of regulation has been rendered possible by the special disposition of the control of this ring mold, which combined with that of the mandrel, requires merely a movement in the same direction as that in which the whole of the apparatus should be displaced to produce bottles of different heights.

The invention will be more clearly understood from the following description and the accompanying drawings in which—

Figure 1:
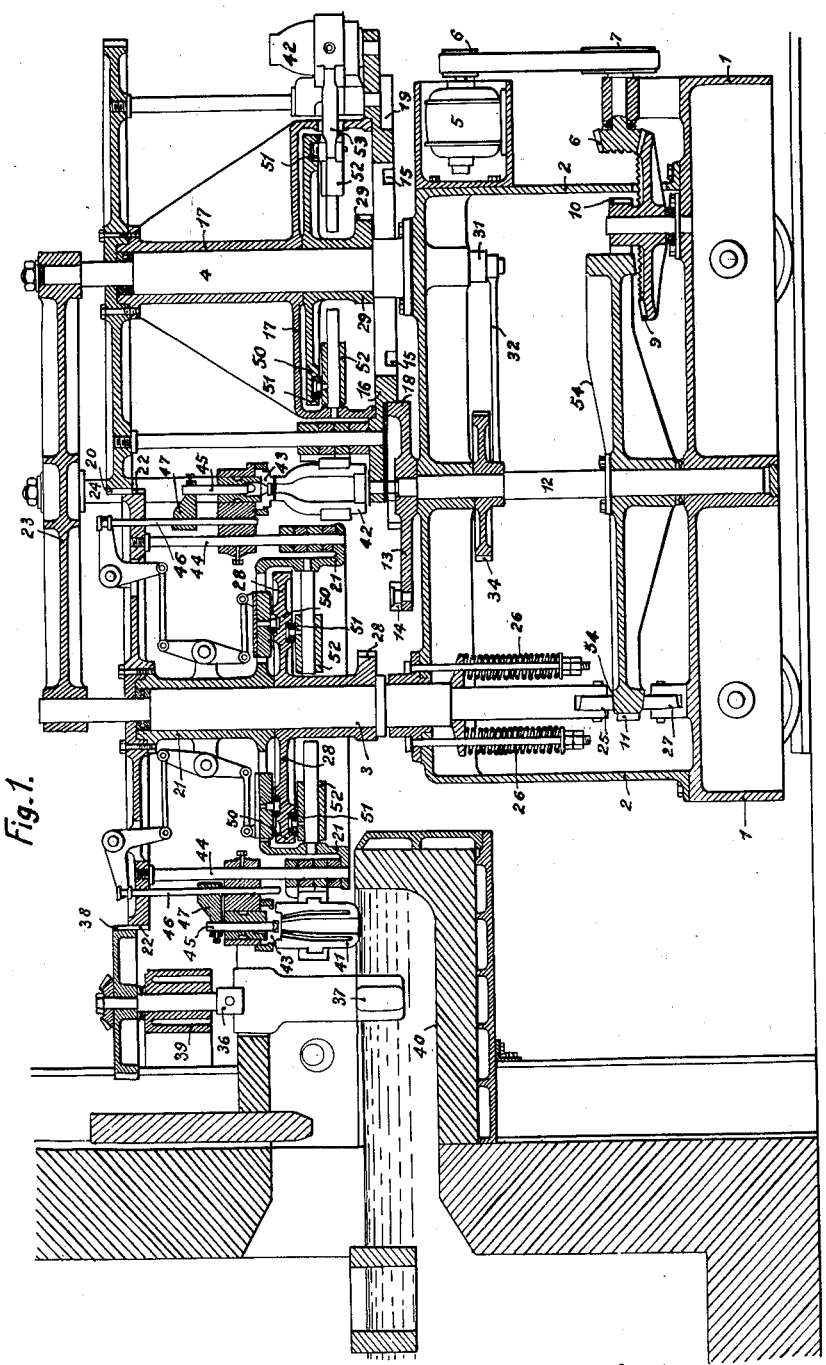
Fig. 1 is a sectional elevation of the machine through the axis of the mold carrying drums and the axis of the reservoir for the glass.

The machine is arranged (see Fig. 1) upon a wheeled carriage 1 supporting the frame 2 which encloses the general driving parts of the machine. Upon the upper part of this frame, the columns 3 and 4 receive respectively the mold carrying drums 21 and 17. The column 3 may be displaced vertically whilst the column 4 is fixed upon the frame 2.

An electric motor 5 transmits to the vertical main shaft 12 a continuous rotary motion by means of pulleys, belts and gear wheels 6, 7, 8, 9, 10 and 11.

Figure 3:
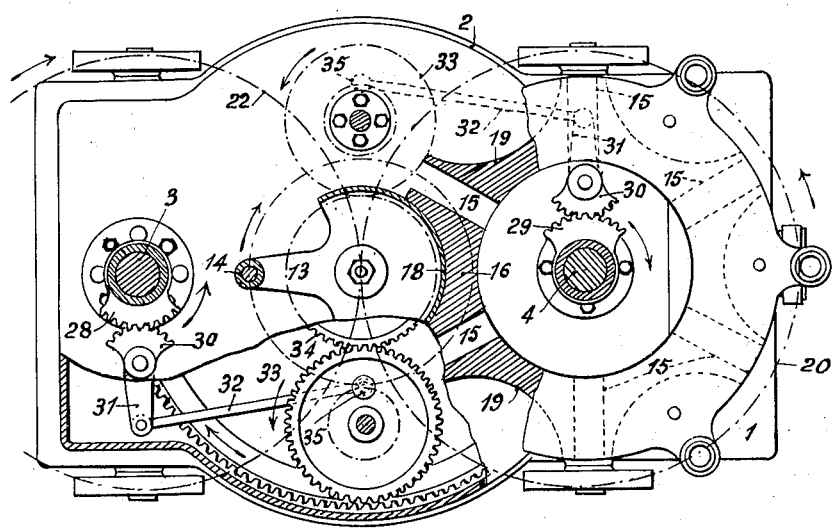
Fig. 3 is likewise a plan view but cut away in order to show the general driving mechanism.

The upper end of the shaft 12 is provided with a crank arm 13 carrying a roller 14 capable of engaging in the grooves 15 of a Maltese cross 16 fixed upon the finisher carrying drum 17. The number of grooves 15 (Fig. 3) being equal to the number of molds, six in the example represented, the drum 17 will move one-sixth of a revolution at each action of the crank arm 13 in the grooves 15. Consequently for one revolution of the shaft 12 the drum 17 will rotate one-sixth of a revolution and will remain stationary during the complementary time which elapses between two successive actions of the roller 14. The position of rest is controlled by the gearing of the sector 18 carried by the crank arm 13, with the recesses 19 of the Maltese cross 16.

The finishing mold carrying drum 17 carries (Figs. 1 and 2) fixed at its upper part, a toothed wheel 20 which gears with a similar toothed wheel 22 fixed likewise upon the upper part of the parison mold carrying drum 21. It follows that the movements communicated to the drum 17 are entirely transmitted to the drum 21.

As stated in the first part of this description, the mold carrying drums receive an intermittent rotary motion and all the molds, carried respectively by each of the drums, pass and are stopped successively in the same positions.

The column 3 around which rotates the parison carrying drum 21 may be moved vertically; for this purpose it is guided in the frame 2 and in an upper support 23, fixed upon the frame 2, by both the column 24 and by the column 4. The lower part of the column 3 carries a roller 25 which rests upon a roller path 54 of the toothed wheel 11, forming a cam and capable of raising and lowering, at fixed times and positions, the said column and consequently the parison mold carrying drum 21. This is one of the advantages referred to above. It will be remarked that the springs 26 partly balance the weight of the mold carrying drum 21 and that a roller 27 supports the wheel 11 to counterbalance the reaction of the lifting of the drum 21.

The columns 3 and 4 carry respectively the cam discs 28 and 29 the lower parts of which are in the form of toothed sectors gearing with other sectors 30 (see Fig. 3) driven by connecting rods and cranks 31, 32, 35. The crank pins 35 form parts of toothed wheels 33 driven by wheel 34 on shaft 12. The rotary motion of the crank pin 35 is therefore absolutely the same as that of the shaft 12. For this purpose the gears 33—34 have the same ratio. It is easy, now, to understand that each of the cam discs 28 and 29 has an oscillating movement and that it is only necessary to have an appropriate connection of the crank pins 35, for this oscillation to be produced in the inverse direction to the motion of the drums 17 and 21 during the stoppage of these latter and in the same direction during their rotation.

A new element of the combination is constituted (see Figs. 1 and 2) by a shaft 36, having two paddles 37, at the upper part of which is fixed a toothed wheel 38 capable of gearing with the toothed wheel 22 of the machine.

The shaft 36 is guided in a support 39 fixed upon the arms of the furnace and the paddles move in the glass in a reservoir 40 attached to the fusion chamber with which it is in communication.

It is sufficient for the ratio between the wheels 22 and 38 to be such that the paddle shaft 36 makes half a revolution whilst the parison carrying drum 21 makes one sixth of a revolution. It will follow that at each successive immersion of the parison molds 41, each paddle will previously have beaten the surface of glass and allowed suction, under good conditions, of a new charge of glass. It is evident that, due to the ratio fixed between the toothed wheels 22 and 38, the beating apparatus may admit of one, two, three or four paddles without changing the nature of the apparatus.

It is necessary, now, to remark that, whatever may be the height of the bottle to be made, the base of the parison mold 41 and that of the finishing mold 42 are always upon the same plane and that only the ring molds 43 are capable of being moved vertically upon the rod 44, upon which they may be fixed in any position.

It follows from this arrangement that bottles of any height may be simultaneously manufactured on this machine, the adjustments, for the greater part, being effected by the dimensions of the molds themselves.

Figure 4:
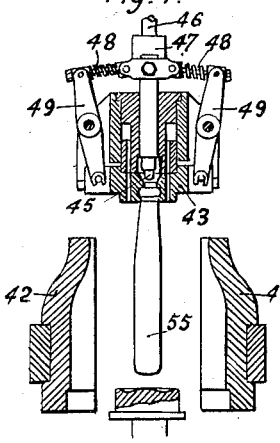
Fig. 4 shows the parison suspended from the ring mold before its descent upon the finishing bottom.

The working of the ring mold 43 and of the mandrel 45 as well as the adjustment of the whole have been combined to simplify the operations to be effected at the time of changing the manufacture. It is only necessary to again examine Figs. 1 and 4 in order to understand that the vertical movement of the shaft 46 is communicated, by the bracket 47, to the mandrel 45 and to each half of the ring mold 43 by the links and levers 48 and 49.

The opening and closing movements of both the parison molds 41 and the finishing molds 42 are brought about by means of cam grooves 50 (see Figs. 1 and 2) in the under surface of the upper parts of the cam discs 28 and 29, respectively. Rollers 51 moving in said cam grooves are attached to slides 52 and operate the double links 53 as plainly shown in Fig. 2.

It is now easy to understand the operation of the machine.

Figure 2:
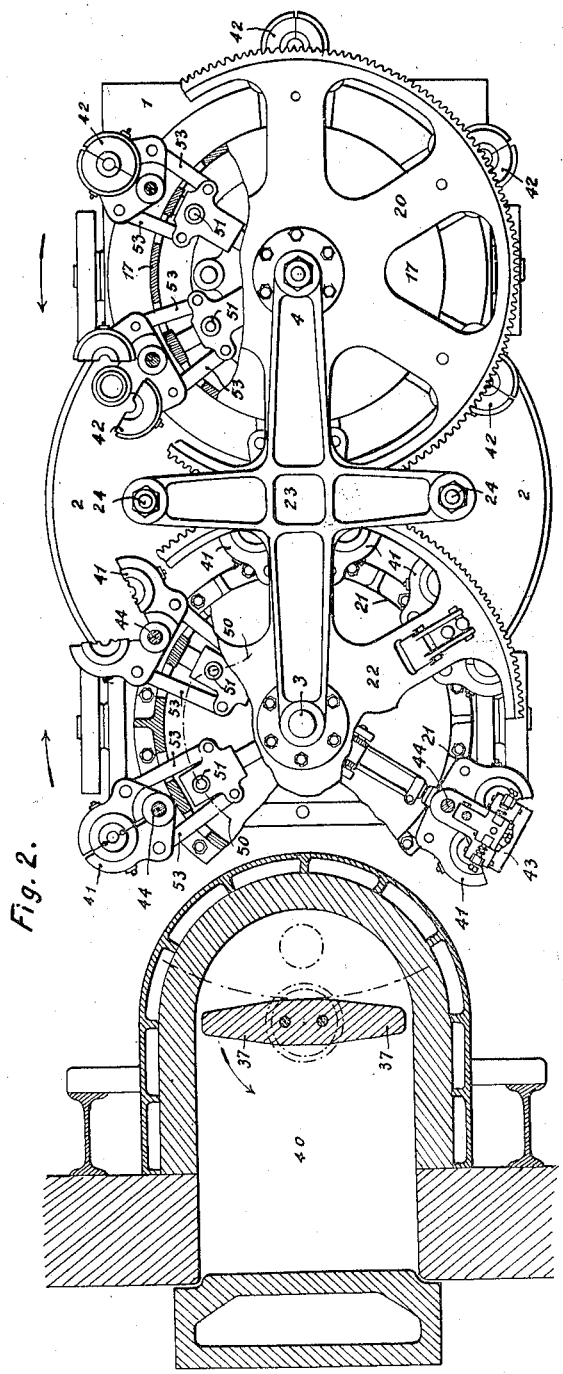
Fig. 2 is a plan view of this machine.
Figure 5:
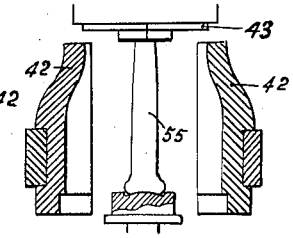
Fig. 5 shows the same parts but after the descent on the parison carrying drum.

It is supposed that the machine occupies the position shown in Fig. 1. A parison mold 41 is in position for suction of the glass to be introduced into the mold. The shaft 12 rotating continuously, when the gathering of glass in the said mold is effected, the cam path 54, by means of the column 3 raises the drum 21 and consequently all the parison molds 41. The roller 14 then causes the rotation of the drum 17 which moves the drum 21 by the toothed wheels 20 and 22. A new parison mold is about to be presented above the glass reservoir at the same time as the paddle 47 has swept the glass where the previous suction has taken place. The parison 55, first drawn up, carried from station to station, will be liberated from its parison mold 41 by the action of the cam path 28 acting during a stoppage of the drum 21, then it will come into contact with the finishing mold carrying drum 17, first in its raised position (see Fig. 4). The lowering of the parison carrying drum 21 will give it the position and shape indicated in Fig. 5. The ring mold 43 will be opened after closure of the finishing mold and will completely release the parison 55 in the said finishing mold 42; the parison mold carrying drum 21 will be raised and will then free the ring from the parison 55. All these motions, which can only take place during a stoppage of the drums 17 and 21, are so far as the molding parts are concerned, due to the oscillation of the cam paths 28 and 29. The parison 55, held in the finishing mold, having thus changed its drum; follows a new trajectory, passes through several other stations during which it is blown and consequently transformed into a bottle, then this latter is cooled in the mold and is expelled therefrom when the mold is opened, which will then be ready to recommence the same duty upon a new parison. Preferably, the opening of the finishing mold will be effected during a stoppage, so that the bottle may be readily withdrawn. The cycle through which the bottle has passed is thus, first as glass in the reservoir and finally the completed bottle withdrawn from the machine.

It should be particularly noted that each of the moulds fulfills successively its duty, each parison mould 41 being connected always with the same finishing mould 42, so that bottles of any forms and size, may be manufactured upon the same machine, during a single cycle of operation.

I claim—

1. A machine for the manufacture of hollow glass objects, especially for the manufacture of bottles, comprising a series of parison molds, an equal series of finishing molds, an equal series of ring molds, each of the molds of one series always cooperating with the same molds of the other two series, a drum carrying the parison moulds, a drum carrying the finishing moulds, two parallel shafts each supporting one of said drums, means for imparting to both drums an intermittent corresponding rotary motion, means for imparting to the parison mould carrying drum only an upward and downward movement during each stoppage of the rotation of the two drums, a first cam disc mounted on the shaft of the parison mold carrying drum, a second cam disc mounted on the shaft of the finishing mold carrying drum, two groups of devices opening and closing the molds, mounted one on the shaft of the parison mold carrying drum and the other on the shaft of the finishing mold carrying drum and controlled respectively by the corresponding cam disc, means for imparting to each of the cam discs an oscillating movement the period of which is in a predetermined relation to the period of intermittent movement of the mould carrying drums.

2. A machine for the manufacture of hollow glass objects, especially for the manufacture of bottles, comprising a series of parison molds, an equal series of finishing molds, an equal series of ring molds, each of the molds of one series always cooperating with the same molds of the other two series, a drum carrying the parison molds, a drum carrying the finishing molds, two parallel shafts each rotatably supporting one of said drums, means for imparting to both drums an intermittent corresponding rotary motion, means for imparting to the parison mold carrying drum only an upward and downward movement during each stoppage of the rotation of the two drums, a first cam disc mounted on the shaft of the parison mold carrying drum, a second cam disc mounted on the shaft of the finishing mold carrying drum, two groups of devices opening and closing the molds, mounted one on the shaft of the parison mold carrying drum and the other on the shaft of the finishing mold carrying drum and controlled respectively by the corresponding cam disc, means for imparting to each of the cam discs an oscillating movement in the contrary direction to the direction of rotation of the mold carrying drums during the stoppage of said mold carrying drums and in the same direction as the movement of the said drums during the rotation of these latter.

3. A machine for the manufacture of hollow glass objects, especially for the manufacture of bottles, comprising a frame, a main driving shaft, a series of parison molds, an equal series of finishing molds, an equal series of ring molds, each of the molds of one series always cooperating with the same molds of the other two series, a drum carrying the parison molds and capable of vertical movement, a drum carrying the finishing molds, two secondary shafts each rotatably supporting one of the drums, means for imparting, from the main shaft, intermittent corresponding movements to the mold-carrying drums, a cam path carried by the main shaft and rotating below the shaft of the parison mold carrying drum, a cam disc mounted on the shaft of the parison mold carrying drum, another cam disc mounted on the shaft of the finishing mold carrying drum, means performing the fashioning operations of the bottles and controlled by the said cam discs, a mechanical connection between the main shaft and each of the cam discs so as to impart thereto an oscillating movement the period of which is in a predetermined relation to the period of the intermittent movement of the mold carrying drums and means actuated by the cam path for imparting to the parison mold carrying drum on upward and downward vertical movement during the stoppage of rotation of the drums carrying the molds.

4. A machine for the manufacture of hollow glass objects, especially for the manufacture of bottles, comprising a frame, a main driving shaft, a series of parison molds, an equal series of finishing molds, an equal series of ring molds, each of the molds of one series always cooperating with the same molds of the other two series, a drum carrying the parison molds and capable of vertical movement, a drum carrying the finishing molds, two secondary shafts, each rotatably supporting one of the drums, means for imparting, from the main shaft, intermittent corresponding movements to the mold carrying drums, a cam path carried by the main shaft and rotating below the shaft of the parison mold carrying drum, a cam disc mounted on the shaft of the parison carrying drum, another cam disc mounted on the shaft of the finisher carrying drum, means performing the fashioning operations of the bottles and controlled by the said cam discs, a rod and crank system between the main shaft and each of the cam discs so as to impart thereto an oscillating movement the period of which is in a predetermined relation to the period of the intermittent movement of the mould carrying drums and means actuated by the cam path for imparting to the parison mold carrying drum on upward and downward vertical movement during the stoppage of rotation of the drums carrying the molds.

5. A machine for the manufacture of hollow glass objects, especially for the manufacture of bottles, comprising a frame, a main driving shaft, a series of parison molds, an equal series of finishing molds, an equal series of ring molds, each of the molds of one series always cooperating with the same molds of the other two series, a drum carrying the parison molds and capable of vertical movement, a drum carrying the finishing molds, two parallel shafts each rotatably supporting one of the drums, said shaft carrying the parison mold carrying drum being mounted for vertical movement, a crank-arm fixed to the main shaft, a Maltese cross fixed to the finishing mold carrying drum, a roller carried by said crank-arm and cooperating with the Maltese cross, a first toothed wheel fixed to the upper part of the finishing mold-carrying drum above the finishing moulds, a second toothed wheel similar to and gearing with the first one and fixed upon the upper part of the parison mold carrying drum above the parison moulds, a roller fixed to the lower part of the shaft of the parison mold carrying drum, a cam path carried by the main shaft and upon which rests said roller, means for vertically guiding the shaft of the parison mold carrying drum, and springs partly balancing the weight of this drum.

6. A machine for the manufacture of hollow glass objects, especially for the manufacture of bottles, comprising: a frame, a main driving shaft, a series of parison molds, an equal series of finishing molds, an equal series of ring molds, each of the molds of one series always cooperating with the same molds in the other two series, a drum carrying the parison moulds and the ring molds, a drum carrying the finishing molds, two secondary shafts each rotatably supporting one of the drums, the shaft carrying the parison mold carrying drum being mounted for making a vertical movement, a Maltese cross fixed upon the finisher carrying drum, means driven by the main driving shaft and imparting to said Maltese cross an intermittent rotary movement, a cam path carried by the main shaft and rotating below the shaft of the parison carrying drum, means for transmitting movement from the cam path to the parison mold carrying drum so as to impart to the latter an upward and downward vertical displacement during the stoppages of rotation of the molds carrying drums, a first series of ring carrying molds each carrying a definite ring mold, a series of parallel rods upon each of which one of the ring carrying molds is adapted to move and be fixed for the purpose of regulating the height of the bottles, a second series of parallel rods controlling the opening of the ring molds, a series of mandrels for punching parisons, a cam disk mounted on the shaft of the drum carrying the parison molds, a rod and crank system driven by the main shaft and imparting to the said cam disc an oscillating movement the period of which is in a predetermined relation to the period of intermittent movement of the drums carrying the molds, means for periodically imparting the movement of the said cam disc to the series of mandrels and to the second series of parallel rods actuating the ring molds.

7. A machine for the manufacture of hollow glass objects of the type comprising two drums, one of which carries a series of parison molds and an equal series of ring molds and the other an equal series of finishing molds, each of the molds of one series cooperating constantly with the same molds in the other two series, two parallel shafts carrying the said two drums, means for imparting synchronous intermittent rotary movements to these drums around the said shafts, means for imparting only to the drum carrying the parison molds and the ring molds a downward movement at the end of each rotary movement of the two drums while the drum carrying the finishing molds remains immobilized during the said downward movement, means for effecting during the downward movement the transfer of a parison into the corresponding finishing mold through the medium of the corresponding ring mold, means for imparting after the transfer of the parison an upward movement to the drum carrying the parison molds and the ring molds.

8. A machine for the manufacture of hollow glass objects, especially for the manufacture of bottles comprising a frame, a main driving shaft, a series of parison molds, a series of finishing molds, a drum carrying the parison molds and capable of vertical movement, a drum carrying the finishing molds, two secondary shafts each rotatably supporting one of said drums, a Maltese cross fixed upon the mold finisher carrying drum, means driven by the main driving shaft for imparting to said Maltese cross an intermittent rotary movement, a cam path carried by the main shaft and rotating below the shaft of the parison mold carrying drum, and means for transmitting movement from the cam to the parison mold carrying drum.

EMILE ROIRANT.